United States Patent [19]

Leigh-Monstevens et al.

[11] Patent Number: 4,911,276

[45] Date of Patent: Mar. 27, 1990

[54] METHOD OF MOTOR VEHICLE ASSEMBLY

[75] Inventors: Keith V. Leigh-Monstevens, Troy; Richard A. Nix, Rochester Hills, both of Mich.

[73] Assignee: Automotive Products plc, Warwickshire, England

[21] Appl. No.: 312,371

[22] Filed: Feb. 15, 1989

Related U.S. Application Data

[63] Continuation of Ser. No. 50,783, May 18, 1987, abandoned, which is a continuation-in-part of Ser. No. 878,121, Jun. 25, 1986, Pat. No. 4,719,444, which is a continuation-in-part of Ser. No. 590,168, Mar. 16, 1984, abandoned.

[51] Int. Cl.⁴ ........................ H01H 3/14; B60K 41/02; F16D 25/08

[52] U.S. Cl. .................................. 192/0.084; 60/534; 92/5 R; 192/85 C; 192/91 R; 200/61.89

[58] Field of Search ................ 192/0.084, 85 R, 85 C, 192/91 R; 92/5 R; 60/328, 534; 200/210, 243, 61.89; 141/1

[56] References Cited

U.S. PATENT DOCUMENTS

| | | | |
|---|---|---|---|
| 2,276,028 | 3/1942 | Dick | 200/59 |
| 2,278,579 | 4/1942 | Bluemle | 200/52 |
| 3,257,522 | 6/1966 | Raab | 200/61.89 |
| 3,273,552 | 9/1966 | Plath | 123/198 |
| 3,411,133 | 11/1968 | Gardner | 340/60 |
| 3,461,425 | 8/1969 | Schultz | 340/71 |
| 3,487,183 | 12/1969 | Schulman | 200/61.89 |
| 3,702,458 | 11/1972 | Capachietti | 340/52 R |
| 3,794,147 | 2/1974 | Shellhause . | |
| 3,812,942 | 5/1974 | Espenschied et al. | 192/91 R |
| 4,354,069 | 10/1982 | Ragen | 200/243 X |
| 4,393,285 | 7/1983 | Hiraiwa et al. | 200/61.88 |
| 4,523,514 | 6/1985 | Burk | 92/5 R |
| 4,599,860 | 7/1986 | Parsons | 60/584 |
| 4,607,670 | 8/1986 | Compton et al. | 60/584 X |
| 4,617,855 | 10/1986 | Wrobleski et al. | 92/5 R |
| 4,621,565 | 11/1986 | Leigh-Monstevens | 92/5 R |
| 4,624,290 | 11/1986 | Compton et al. | 60/584 X |
| 4,624,291 | 11/1986 | Compton et al. | 60/584 X |
| 4,664,239 | 5/1987 | Symes et al. | 192/0.084 |
| 4,719,444 | 1/1988 | Leigh-Monstevens et al. | 200/61.89 |
| 4,742,193 | 5/1988 | Kassin et al. | 200/61.89 |

FOREIGN PATENT DOCUMENTS

| | | | |
|---|---|---|---|
| 2066919 | 7/1981 | United Kingdom | 192/0.084 |

*Primary Examiner*—Rodney H. Bonck
*Attorney, Agent, or Firm*—Krass and Young

[57] ABSTRACT

A method of assembling a motor vehicle in which a multicontact switch is provided on the input rod of the master cylinder of a prefilled master and slave cylinder hydraulic apparatus; the master cylinder is positioned in the engine compartment of a vehicle and the input rod, with the switch mounted thereon, is passed from the engine compartment through an aperture in the firewall of the vehicle to position the input rod and switch in the passenger compartment of the vehicle and position the master cylinder housing adjacent the fire wall; the master cylinder is secured to the fire wall; and the plug of a wiring harness including several electrical vehicle circuits is plugged into a multiple contact outlet socket on the switch so as to provide a plurality of electrical control systems for the vehicle respectively controlled by the contacts of the switch. For example, the switch contacts may control a cruise control disconnect circuit, an electronic fuel injection circuit, and an ignition interlock circuit. As the input rod of the master cylinder is stroked in response to operator depression of the clutch pedal, the clutch of the vehicle is actuated and the several electrical vehicle circuits are simultaneously and successively activated or deactivated as the input rod goes through its stroking movement with respect to the housing of the master cylinder.

17 Claims, 3 Drawing Sheets

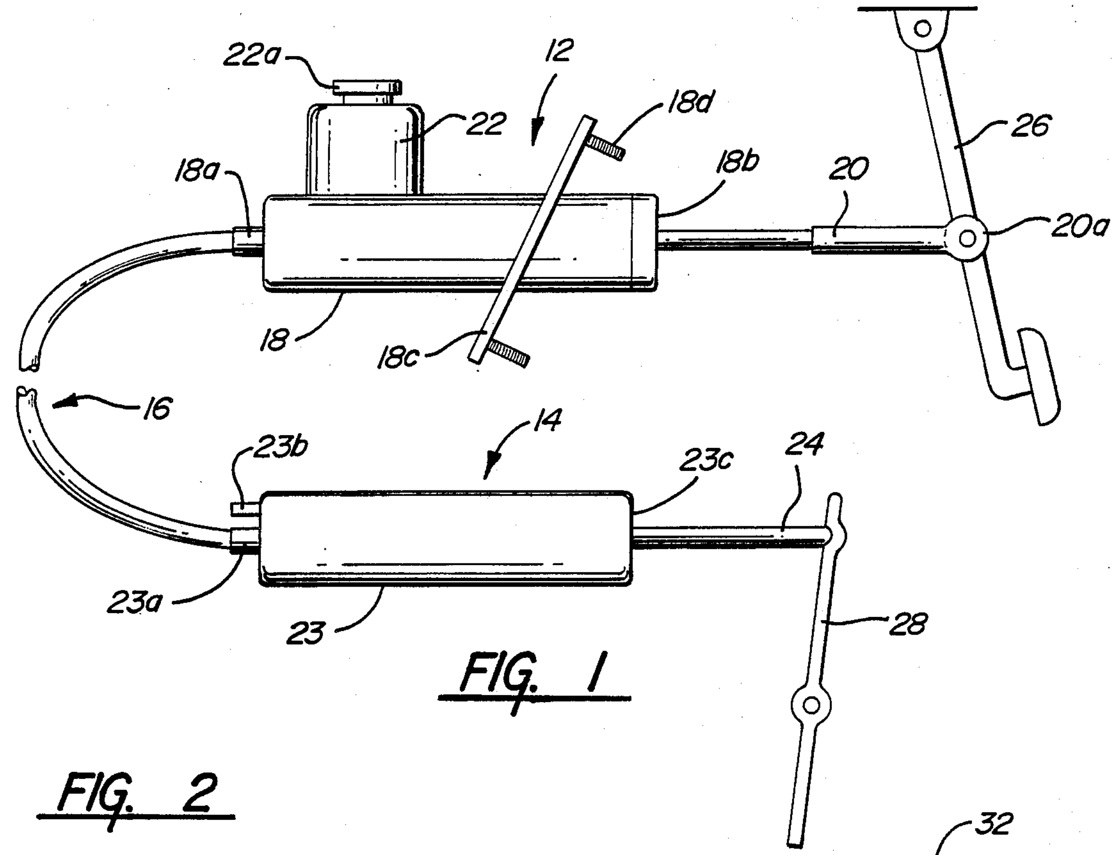
FIG. 1
FIG. 2
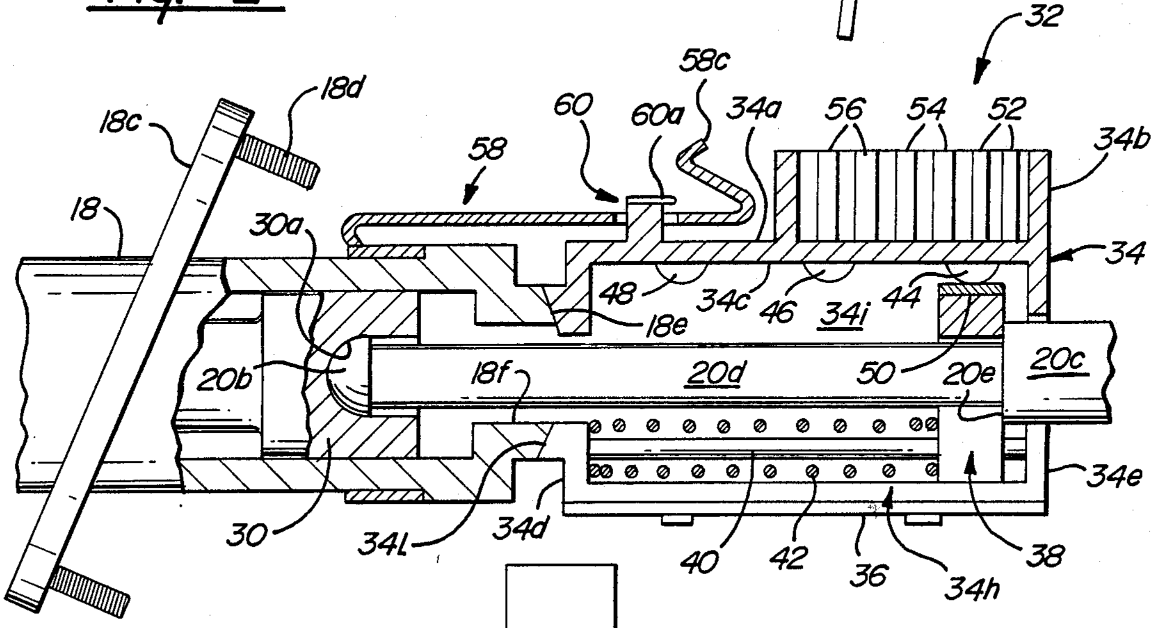
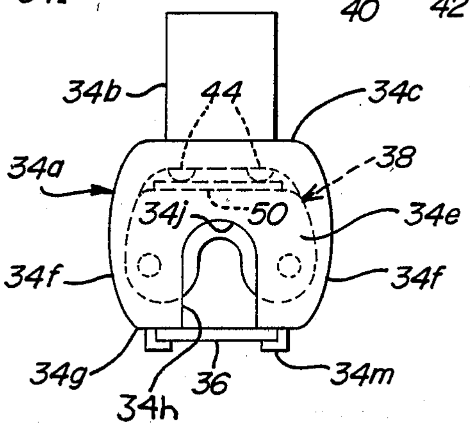
FIG. 3

METHOD OF MOTOR VEHICLE ASSEMBLY

RELATED APPLICATIONS:

This application is a continuation of U.S. Pat. Application Ser. No. 050,783, filed May 18, 1987 which in turn is a continuation-in-part of U.S. Pat. Application Ser. No. 878,121, filed June 25, 1986 (now U.S. Pat. No. 4,719,444) which in turn is a continuation-in-part of U.S. Pat. Application Ser. No. 590,168, filed Mar. 16, 1984 and now abandoned.

BACKGROUND OF THE INVENTION

This invention relates to methods of assembling motor vehicles and, more particularly, relates to a method for providing a hydraulic control system for the vehicle and a plurality of electrical control systems for the vehicle.

The assembly of a motor vehicle is a complicated and time consuming process involving substantial labor and materials costs. Any method whereby the assembly of the vehicle can be simplified therefore produces direct cost savings to the vehicle manufacturer. In the past, it has been proposed to simplify the installation of a friction clutch release apparatus for the vehicle by providing a prefilled master cylinder and slave cylinder assembly to the manufacturer which is thereafter installed in prefilled form on the vehicle to provide a hydraulic control system for the vehicle clutch at a minimum of labor. Prefilled master and slave cylinder apparatus of this type are shown, for example, in U.S. Pat. No. 4,599,860 assigned to the assignee of the present application.

Prefilled apparatus of this type have achieved wide acceptance in the automotive industry because of the substantial time saving effected by the delivery and ready installation of the prefilled assembly onto the motor vehicle. Many other control systems for the vehicle continue to be provided by the use of assembly processes that are relatively complex and relatively labor intensive. For example, the modern day automobile includes many electrical control systems and, in general, these systems are individually installed in the motor vehicle during the assembly process utilizing assembly processes that are both time consuming and subject to assembly error.

SUMMARY OF THE INVENTION

This invention is directed to the provision of an improved method of assembly for a motor vehicle.

More particularly, this invention is directed to the provision of a simple and inexpensive means for providing a hydraulic control system and a plurality of electrical control systems for the vehicle.

More particularly, this invention is directed to the provision of a method of assembling a motor vehicle in which a hydraulic control system is provided for the clutch of the vehicle and a plurality of electrical control systems are simultaneously provided for the vehicle.

The invention method comprises the steps of forming a master cylinder having a housing including a discharge fitting and an input rod extending into the input end of the housing; filling the master cylinder with hydraulic fluid so that axial stroking movement of the input rod relative to the housing delivers pressurized fluid from the discharge fitting for delivery to a slave cylinder to operate a control mechanism of the vehicle; providing a switch having a plurality of spaced contacts and a plurality of outlets corresponding to the contacts; and mounting the switch on the input rod of the master cylinder in a manner such that the contacts are successively made or broken in response to axial stroking movement of the input rod relative to the master cylinder housing. This method allows the preassembled and prefilled master cylinder and switch to be delivered to a motor vehicle manufacturer who may connect the master cylinder to the body of the vehicle, connect the associated slave cylinder to the vehicular control mechanism, and connect a plurality of electrical vehicle circuits to the plurality of outlets of the switch to provide a plurality of electrical control systems for the vehicle respectively controlled by the contacts of the switch. The invention method thus provides a hydraulic control system for a control mechanism of the vehicle and simultaneously provides a plurality of electrical vehicle circuits.

According to a further feature of the invention, following delivery of the preassembled and prefilled master cylinder and switch to a motor vehicle manufacturer, the master cylinder is positioned in the engine compartment of tee vehicle, the input rod with the switch mounted thereon is passed through an aperture in the firewall of the vehicle to position the input rod and switch in the passenger compartment of the vehicle and position the master cylinder adjacent the vehicle firewall, the master cylinder is secured to the vehicle firewall, and the electrical vehicle circuits are connected to the switch outlets. The invention method thus simplifies the assembly line installation process for the hydraulic control system and the vehicle circuits, allowing the process to be performed by unskilled labor and in a minimum of time.

According to a further feature of the invention method, the switch is mounted on the input rod of the master cylinder in a manner to bias the switch against the input end of the master cylinder housing while allowing swiveling movement of the switch relative to the master cylinder housing. This arrangement allows the switch to move swivelly on the master cylinder housing in response to the typical swiveling movement of the input rod of the master cylinder so that the precisely engineered respective distances between the several contacts of the switch remain constant.

According to a further feature of the invention, the electrical vehicle circuits are drawn together into a harness including a plug, the switch includes a socket encompassing the various outlets of the switch, and the plug of the harness is plugged into the socket of the switch to provide the several vehicular electrical circuits. This arrangement further reduces the assembly line time required to provide the hydraulic control system and the several electrical circuits for the vehicle.

According to a further feature of the invention, means are provided to maintain the switch in a predetermined angular orientation relative to the housing of the master cylinder so as to facilitate movement of the input rod and switch through the aperture in the firewall of the vehicle and thereby ensure a predetermined angular disposition of the switch relative to the input rod in the final disposition of the switch within the passenger compartment.

In a disclosed embodiment of the invention, the hydraulic system controls the release bearing of the clutch of the vehicle and the electrical vehicle circuits control an ignition interlock system for the vehicle, a cruise control for the vehicle, and an electronic fuel injection system for the vehicle.

BRIEF DESCRIPTION OF THE DRAWINGS

FIG. 1 is a somewhat schematic view of a prefilled master and slave cylinder apparatus utilized in the invention method;

FIG. 2 is a view of a switch and master cylinder assembly in the invention method;

FIG. 3 is an end view of the switch of FIG. 2;

DETAILED DESCRIPTION OF THE PREFERRED EMBODIMENT

Figure 4:
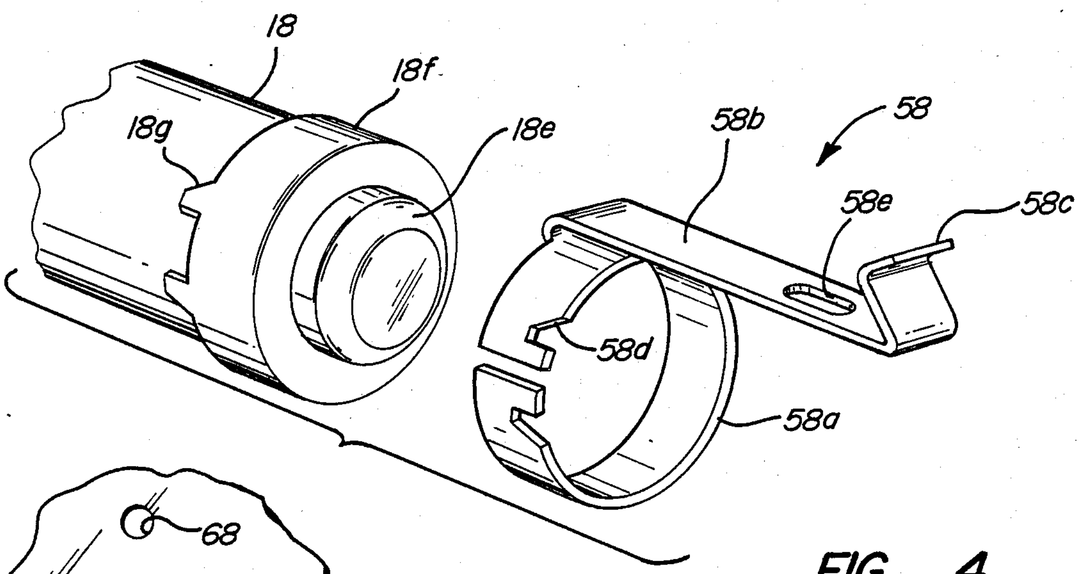
FIG. 4 is an exploded perspective view showing the manner in which the switch of FIG. 2 is oriented relative to master cylinder of FIG. 2.
Figure 5:
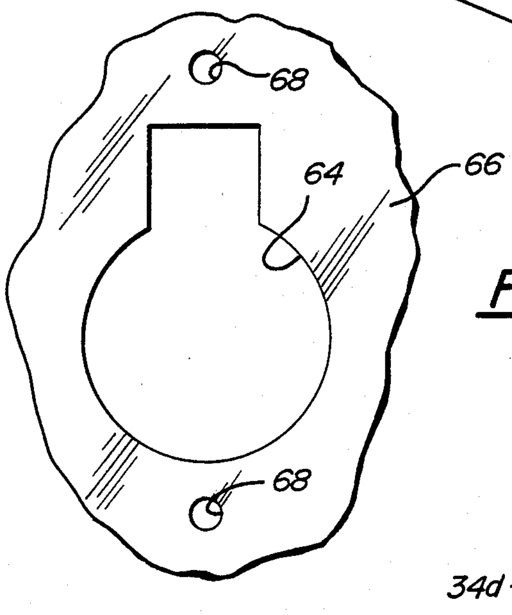
FIG. 5 a fragmentary view of a vehicular firewall.
Figure 6:
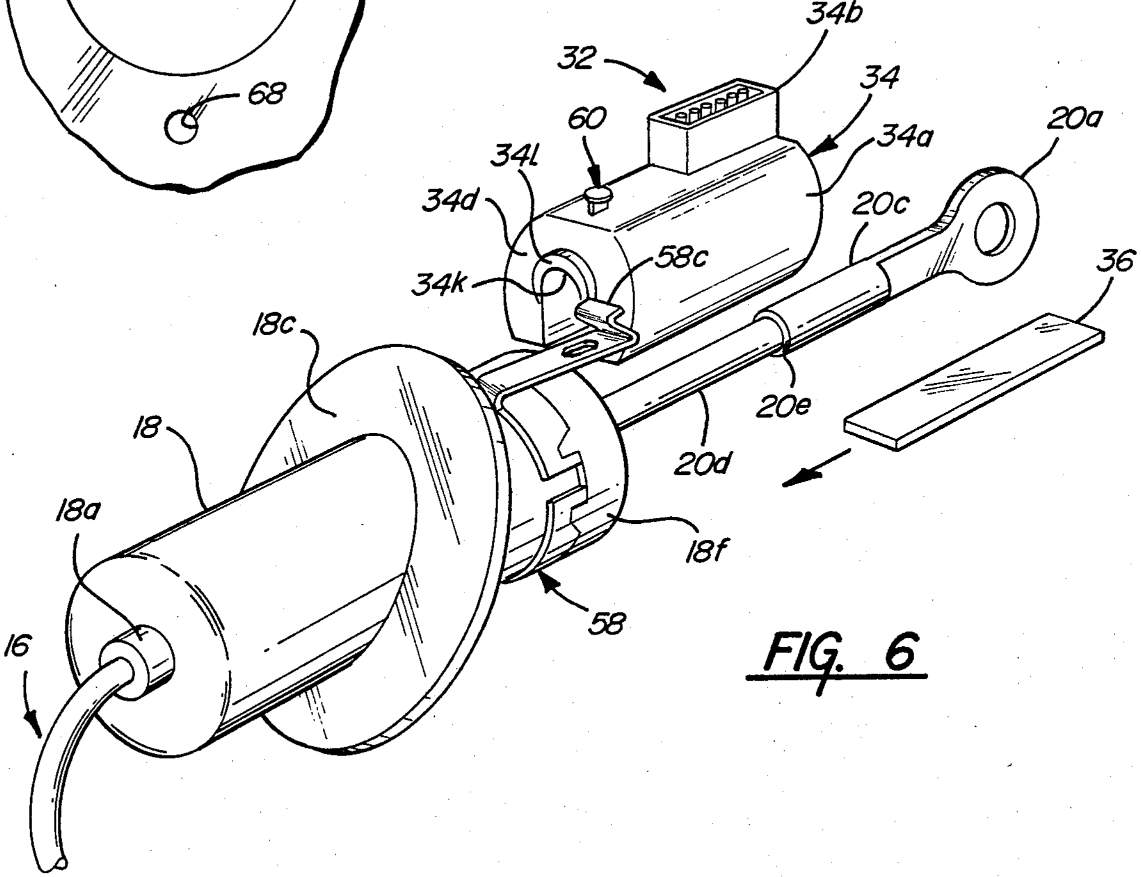
FIGS. 6, 7 and 8 show successive steps in the invention assembly method.
Figure 7:
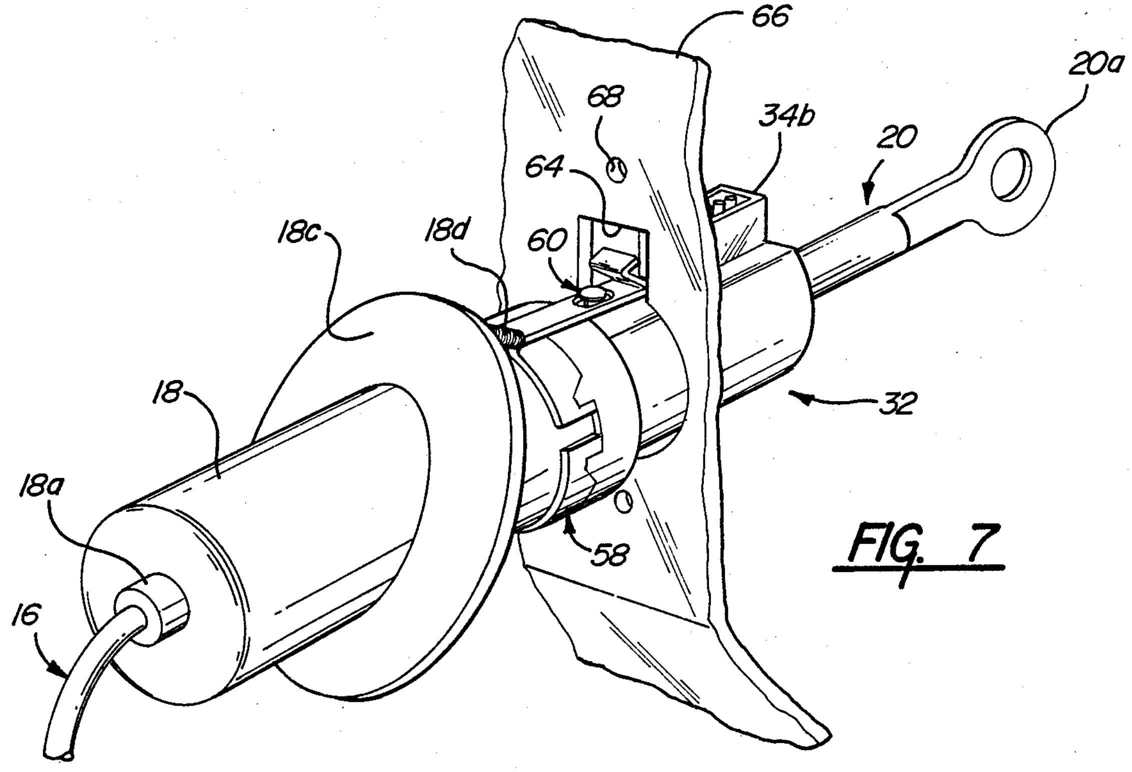
Figure 8:
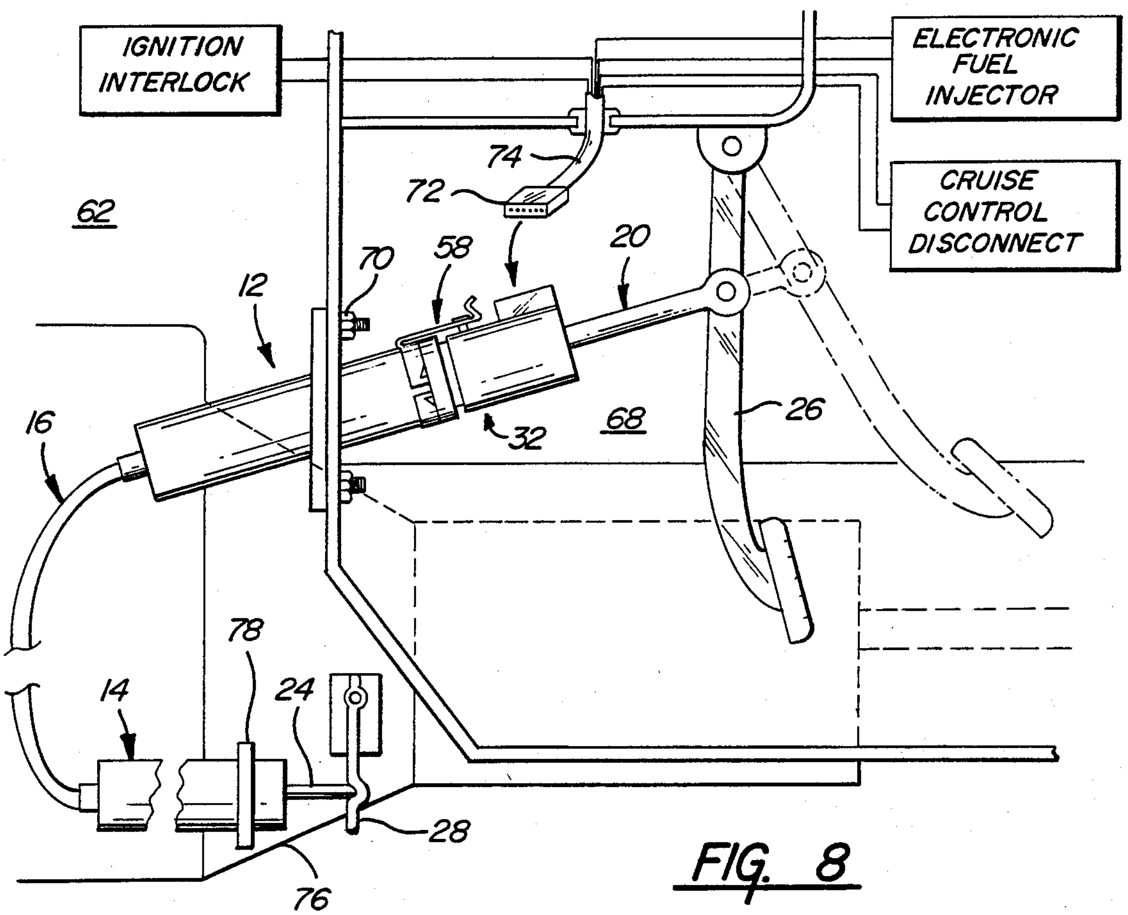

The invention utilizes a prefilled master and slave cylinder apparatus shown generally at 10 in FIG. 1. Apparatus 10 may be of the type disclosed in U.S. Pat. No. 4,599,860. Apparatus 10 includes a slave cylinder 12, a master cylinder 14, and a conduit 16 extending from the discharge of the master cylinder to the inlet of the slave cylinder.

Master cylinder 12 includes a master cylinder housing 18 having a discharge fitting **18*a* and an input rod 20 extending into the input end 18*b* of the housing 18. A reservoir 22 is formed integrally with housing 18 and communicates in known manner with the pressure chamber defined within housing 18. A flange 18*c* integral with housing 18 includes studs 18*d*** to facilitate attachment of the master cylinder to a suitable vehicular bulkhead.

Slave cylinder 14 includes a cylindrical housing 23 including an inlet fitting **23*a* and a bleed orifice 23*b*. Slave cylinder 14 further includes an output rod 24 extending from the outlet end 23*c*** of the slave cylinder housing.

Conduit 16 is a high pressure conduit and extends between the outlet fitting **18*a* of master cylinder 12 and the inlet fitting 22*a* of slave cylinder 14**.

Alternatively, the prefilled master and slave cylinder apparatus 10 may comprise a master cylinder having a quick connect fitting at its discharge fitting, a slave cylinder, and a conduit connected at one end to the inlet fitting of slave cylinder and having a quick connect fitting for releasable coupling coaction with the quick connect fitting on the discharge fitting of the master cylinder. As a further alternative, the slave cylinder of apparatus 10 may have a quick connect fitting at its inlet fitting and the conduit may be connected at one end to the discharge fitting of the master cylinder and have a quick connect fitting at its other end for releasable coupling coaction with the quick connect fitting on the inlet fitting of the slave cylinder. As a still further alternative, a pair of conduits may be respectively connected to the discharge fitting of the master cylinder and the inlet fitting of the slave cylinder and quick connect fittings may be provided at the free ends of the couplings for releasable coupling coaction.

In a typical use of the prefilled master and slave cylinder apparatus 10 of FIG. 1 or its described alternatives, the input rod of the master cylinder is connected at its free end **20*a* to a clutch pedal control lever 26 for the vehicle and the free end of the output rod of the slave cylinder is operatively associated with a release lever 28** of a release bearing assembly for the clutch of the vehicle.

The master cylinder 12, as seen in further detail in FIGS. 2 and 4, includes a piston 30 slideably mounted within housing 18 and including a socket **30*a* receiving the spherical head portion 20*b* of input rod 20. Housing 18 defines an annular spherical bearing surface 18*e* at the input end of the housing in concentric surrounding relation to the central bore 18*f* passing input rod 20. Input rod 20 includes an eye portion constituting its free end 20*a*, a main body portion 20*c*, and a reduced diameter portion 20*d* extending between head portion 20*b* and main body portion 20*c* and defining an annular shoulder 20*e* at the joinder of main body portion 20*c* and reduced diameter portion 20*d***.

The switch utilized in the invention assembly method is seen generally at 32. Switch 32 includes a housing 34, a cover plate 36, a plunger 38, guide rods 40, coil springs 42, and spaced contact pairs 44, 46 and 48.

Housing 34 is preferably formed of a phenolic material and includes a main body portion **34*a* and a socket portion 34*b* upstanding from the upper face of main body portion 34*a*. Main body portion 34*a*, as best seen in FIGS. 2 and 3, includes a flat upper wall 34*c*, end walls 34*d* and 34*e*, arcuate side walls 34*f*, and laterally spaced bottom wall portions 34*g* separated by a central axial lot 34*h*. Walls 34*c*, 34*d*, 34*e*, 34*f*, and 34*g* coact to define an axially extending housing hollow 34*i*. Downwardly opening slots 34*j* and 34*k* are provided respectively in each end wall. Slots 34*j* and 34*k* have a width corresponding to the width of slot 38*h* and are sized to loosely pass the reduced diameter portion 20*d* of the input rod. A semiannular spherical bearing surface 34*l* is provided at the end 34*d* of the housing for coaction with spherical bearing surface 18*e* on the master cylinder. Surface 34*l* has a U configuration and embraces the upper end of slot 34*k* in end wall 34*d***.

Plunger 38 has a U or horseshoe configuration generally matching the interior cross-sectional configuration of housing main body **34*a* and includes a contact strip 50, of electrically conductive material, secured to its upper face. Each leg of the plunger is slideably mounted on a guide rail 40. Guide rails 40 extend rigidly and axially between end walls 34*d* and 34*e* and coil springs 42 are positioned concentrically around the guide rails and act to constantly bias plunger 38 toward end wall 34*e*** of the housing.

Contact pairs 44, 46 and 48 are secured to the underface of the upper wall **34*c* of the housing within the hollow 34*i* of the housing and in proximity to the path of sliding movement of plunger 38 within the housing. Contact pairs 44, 46 and 48 are formed of electrically conductive material and are respectively connected in known manner to three corresponding sets of contact fingers or prongs 52, 54 and 56 provided in upstanding serial fashion within socket portion 34*b***.

Switch 32 is maintained in a predetermined angular disposition relative to housing 18 of master cylinder 12 by a spring clip 58 coacting with a pin member 60 formed integrally with the upper wall **34*c*** of the main body portion of the switch housing.

Clip 58 is formed of a suitable spring steel material and includes a main body split ring portion **58*a*, a finger portion 58*b*, and a handle portion 58*c*. Main body split ring portion 58*a* is adapted to pass over a collar portion 18*f* on the input end of the master cylinder and seat snappingly around the master cylinder housing. Locator notches 58*d* at the opposite ends of main body portion 58*a* coact with locator plug portions 18*g* formed on housing 18 to positively locate the spring clip in a predetermined fixed angular position relative to housing 18 so as to position finger portion 58*b* in a predetermined fixed angular position relative to housing 18. Finger portion 58*b* extends in cantilever fashion from main body split ring portion 58*a* and defines an aperture or slot 58*e* for receipt of pin member 60. Handle portion 58*c* extends upwardly from the free end of finger portion 58*b* and is adapted to be grasped to flex finger portion 58*b* about its juncture with main body split ringer portion 58*a***.

Pin member 60 is adapted to pass upwardly through aperture **58*e* and includes a head portion 60*a* to preclude inadvertant dislodgment of the pin member 60 from aperture 58*e***.

In the practice of the invention assembly method, the discharge fitting **18*a* of master cylinder 12 and the inlet fitting 22*a* of slave cylinder 14 are connected to the respective ends of conduit 16; the cap 22*a* of reservoir 22 is removed; and the apparatus is filled by connecting a source of hydraulic fluid under pressure to the reservoir and loosening a grub screw in bleed orifice 22*b* of the slave cylinder. The grub screw is adjusted to close the bleed orifice when the liquid flow through the bleed orifice includes no air, and the reservoir cap is replaced. Spring clip 58 is now positioned on the input end of the master cylinder housing and switch 32 is mounted onto input rod 20 by moving the switch from a position at one side of the input rod transversely into mounting engagement with the input rod. As the switch is moved transversely relative to the input rod, slots 34*h*, 34*j* and 34*k* pass over reduced diameter input rod portion 20*d*, swivel surface 34*l* engages swivel surface 18*e* on the input end of the master cylinder housing, and plunger 38 is pushed into abutting engagement with input rod shoulder 20*e* by springs 42. After the switch has been positioned around the input rod, cover plate 36 is positioned against bottom housing wall 34*g* by the use of integral lugs 34*m* to totally encapsulate input rod 20 within the switch housing. The switch is now rotated to bring pin member 60 into alignment with the finger portion 58*b* of clip member 58 to pass the pin member through the aperture 58*e* by appropriate flexing movement of the finger portion 58*b***.

With switch 32 mounted on the input rod, springs 42 urge plunger 38 against input rod shoulder **20*e* and urge the switch housing into engagement with the input end of the master cylinder housing to maintain firm bearing coaction between swivel surfaces 18*e* and 34*l*. In this home or rest position, contact member 50 on plunger 38 spans contacts 44 to complete a circuit to outlets 52**. The prefilled and preassembled apparatus is now ready for shipment to a motor vehicle manufacturer for assembly into the motor vehicle in an assembly line process.

In the vehicle assembly line process, the master cylinder 12 is positioned in the engine compartment 62 of the vehicle and the input rod 20 with switch 32 mounted thereon is passed from the engine compartment 62 through an aperture 64 in the fire wall 66 of the vehicle to position the input rod and switch in the passenger compartment 68 of the vehicle and position flange portion **18*c* of master cylinder housing 18 against the engine compartment face of the fire wall with mounting studs 18*d* passing through apertures 68 in the fire wall. The master cylinder is now secured to the fire wall by the use of nuts 70 or the like, whereafter the plug 72 of a wire harness 74 is plugged into switch socket 34*b* to respectively connect a plurality of electrical vehicle circuits to the plurality of outlets 52, 54, 56 of the switch to provide a plurality of electrical control systems for the vehicle respectively controlled by contact pairs 44, 46 and 48**.

For example, the contact pairs 44, 46 and 48 may be arranged to respectively control a cruise control disconnect circuit, an electronic feel injector circuit, and an ignition interlock circuit.

When the prefilled master and slave cylinder apparatus of the invention is utilized to engage and disengage the clutch of the vehicle, input rod 20 is connected to clutch pedal control lever 26, slave cylinder 14 is secured to the bell housing 76 of the vehicle by a bell housing bracket 78, and the free end of the output rod 24 of the slave cylinder is operatively engaged with the release lever 28 of the release bearing of the clutch of the vehicle.

The simple assembly method of the invention thus simultaneously provides a hydraulic control system for the clutch of the vehicle as well as a plurality of electrical control systems for the vehicle. Specifically, as the clutch pedal lever 26 is actuated by the vehicle operator to provide stroking movement of the input rod 20 relative to the master cylinder housing 18, pressurized fluid is delivered through conduit 16 to slave cylinder 14 to extend output rod 24 and operate release lever 28 in known manner to disengage the clutch of the vehicle. At the same time, the stroking movement of the input rod selectively makes or breaks contact pairs 44, 46 and 48 to selectively activate or deactivate the associated vehicular electrical circuits. In the illustrated embodiment, the switch plunger 38, through strip contact 50, normally closes the cruise control circuit by the spanning action of contact 50 with respect to contact pair 44 so that the first fractional stroking movement of the input rod in response to depression of the clutch pedal lever moves contact 50 out of spanning relation to contact air 44 and breaks the cruise control circuit so as to deactivate the cruise control. As the stroking movement of the input rod continues, contact 50 first spans contact pair 46 to complete an electronic fuel injector circuit an thereafter, with continued stroking movement of the input rod, spans contact pair 48 to complete the ignition interlock circuit and enable starting of the engine.

The invention method will be seen to simultaneously provide hydraulic control apparatus for the clutch of the vehicle as well as a plurality of electrical control systems for the vehicle. The actual assembly operation on the assembly line of the vehicle, where assembly time is most precious and labor cost is most intensive, consists in merely passing the input rod and switch through the aperture in the fire wall of the vehicle, fastening the master cylinder to the firewall, plugging the plug of the wiring harness into the socket of the switch, connecting the clutch pedal to the free end of the input rod of the master cylinder, mounting the slave cylinder to the bell housing of the vehicle, and engaging the free end of the output rod of the slave cylinder with the release lever of the bearing release assembly. This entire operation requires less than 10 seconds and yet, in this short time, the control system for the vehicle clutch is provided and a plurality of electrical control systems for the vehicle are simultaneously provided. As compared to prior art methodology where each of these several systems are provided separately, the invention method establishes the control systems at a fraction of the time previously required nd therefore at a fraction of the cost previously required.

Further, since the invention method allows much of the actual assembly time and labor to be performed in subassembly operations prior to installation in the vehicle, the quality control may be significantly improved as compared to prior art systems where each of the involved systems was individually provided by assembly operations taking place on the vehicle. For example, the prefilled master cylinder and slave apparatus may be carefully tested prior to delivery to the manufacturer; the switch 32 may be manufactured in a carefully controlled environment and pretested prior to installation on the push rod of the master cylinder; and the wiring harness may be preassembled in a high quality control environment and delivered in a pretested form to the manufacturer. The various subassemblies delivered to the manufacturer have thus been pretested and subjected to high quality control and the simple manufacturing steps required on the assembly line are virtually idiot proof. The invention method thus reduces assembly time as well as increasing the quality of the final product with consequent reductions in warranty costs.

Whereas a preferred embodiment of the invention has been illustrated and described in detail it will be apparent that various changes may be made :n the embodiment without departing from the scope or spirit of the invention.

We claim:

1. A method of providing a preassembled apparatus for providing a hydraulic control system and a means of controlling a plurality of electrical control systems for a motor vehicle, said method comprising:

(A) forming a master cylinder having a housing including a discharge fitting and an input rod extending at one end thereof into one end of the housing and having means at the other, free end thereof for connection to an operator actuated control pedal for the motor vehicle;

(B) filling the master cylinder with hydraulic fluid so that axial stroking movement of the input rod relative to the housing delivers pressurized fluid from the discharge fitting which may be delivered to a slave cylinder to operate a control mechanism on the vehicle;

(C) providing a switch having a plurality of axially spaced contacts and a plurality of outlets corresponding to said contacts; and (D) mounting said switch on said input rod in a manner such that said contacts are spaced axially along said input rod between said one end of said housing and said free end of said input rod and are successively made or broken in response to axial stroking movement of said input rod relative to said master cylinder housing, whereby the preassembled and prefilled master cylinder and switch may be delivered to a motor vehicle manufacturer who may connect the master cylinder to the body of the vehicle, connect the associated slave cylinder to the vehicular control mechanism, and connect a plurality of electrical vehicle circuits to the respective outlets of the switch to thereby provide a hydraulic control system for operating the control mechanism of the vehicle in response to stroking of the input rod and simultaneously provide a means of controlling a plurality of electrical control systems for the vehicle which are activated or deactivated by the stroking of the input rod.

2. The method of claim 1 and including the further steps of:

(E) mounting the preassembled and prefilled master cylinder and switch in the vehicle during the vehicle assembly process;

(F) connecting the input rod of the master cylinder to the operator actuated control pedal; and (G) connecting a plurality of electrical vehicle circuits to the respective outlets of the switch.

3. The method of claim 2 and including the further steps of:

(H) positioning the outlets of the switch within a socket housing of the switch;

(I) packaging the electrical vehicle circuits into a harness having a plug member including outlets respectively corresponding to the several vehicle circuits; and (J) positioning the plug of the harness within the socket of the switch housing to respectively connect the various electrical vehicle circuits to the various switch outlets.

4. The method of claim 1 and including the further steps of:

(E) forming a slave cylinder having a housing including an inlet fitting and an output rod extending from the output end of the slave cylinder housing;

(F) forming a conduit means for respective connection at its opposite ends to the discharge fitting of the master cylinder housing and the inlet fitting of the slave cylinder housing;

(G) filling the conduit means and slave cylinder with hydraulic fluid; and (H) delivering the preassembled and prefilled master cylinder, conduit means, and slave cylinder, with said switch mounted on the master cylinder input rod, to the vehicle manufacturer for installation in the vehicle in the vehicle assembly line process.

5. A method according to claim 1 wherein:

(E) said switch includes a hollow housing and said contacts are spaced axially within said hollow housing; and (F) said mounting step includes mounting said switch housing on said input rod with said input rod passing through the hollow of said switch housing and one end of said switch housing positioned against said one end of said master cylinder housing to position said contacts serially along said input rod.

6. A method of providing a hydraulic control system and a means of controlling a plurality of electrical control systems for a motor vehicle, said method comprising:

(A) forming a master cylinder having a housing including a discharge fitting and an input rod extending at one end thereof into one end of the housing and having means at the other, free end thereof for connection to an operator actuated control pedal of the motor vehicle;

(B) filling the master cylinder with hydraulic fluid so that axial stroking movement of the input rod relative to the housing delivers pressurized fluid from the discharge fitting which may be delivered to a slave cylinder to operate a control mechanism of the vehicle;

(C) providing a switch having a plurality of axially spaced contacts and a plurality of outlets corresponding to said contacts;

(D) mounting said switch on said input rod in a manner such that said contacts are spaced axially along said input rod between said one end of said housing and said free end of said input rod and are successively made or broken in response to axial stroking movement of the input rod relative to said master cylinder housing;

(E) positioning said master cylinder in the engine compartment of the vehicle and passing said input rod with said switch mounted thereon from the engine compartment through an aperture in the firewall of the vehicle to position the input rod and switch in the passenger compartment of the vehicle and position the master cylinder housing adjacent the firewall;

(F) securing said master cylinder housing to said firewall;

(G) connecting said input rod to the operator actuated control pedal; and (H) respectively connecting a plurality of electrical vehicle circuits respectively controlling a plurality of vehicle control systems to the plurality of outlets of said switch so that the plurality of electrical control systems for the vehicle are respectively controlled by the contacts of said switch, whereby axial stroking movement of said input rod relative to said master cylinder housing in response to operator actuation of said control pedal operates the control mechanism of the vehicle and selectively activates or deactivates the several electrical control circuits of the vehicle to respectively control the associated electrical control systems of the vehicle.

7. A method according to claim 6 including the further step of:

(I) providing means maintaining said switch in a predetermined angular orientation relative to said master cylinder housing to facilitate passage of said input rod with said switch mounted thereon through the aperture in the firewall of the vehicle and position the switch in a desired angular position relative to the input rod in the passenger compartment of the vehicle to facilitate connection of the electrical vehicle circuits to the outlets of the switch.

8. A method according to claim 6 and including the further steps of:

(I) positioning the outlets of said switch within a socket housing of the switch;

(J) packaging said electrical vehicle circuits into a harness having a plug member including outlets respectively corresponding to the several circuits; and (K) positioning the plug of said harness within the socket of the switch housing to respectively connect the various electrical vehicle circuits to the various switch outlets.

9. A method according to claim 6 including the further steps of:

(I) forming a slave cylinder having a housing including an inlet fitting and an output rod extending from the output end of the slave cylinder housing;

(J) forming conduit means for respective connection at its opposite ends to the discharge fitting of the master cylinder and the inlet fitting of the slave cylinder;

(K) filling the conduit means, and slave cylinder with hydraulic fluid;

(L) delivering the prefilled and preassembled master cylinder, conduit means, and slave cylinder, with said switch mounted on the master cylinder input rod, to the vehicle manufacturer for installation in the vehicle in the vehicle assembly line process; and (M) connecting the output rod of the slave cylinder to the vehicle control mechanism during the vehicle assembly line process.

10. A method according to claim 6 wherein:

(I) the control mechanism comprises a release bearing assembly for the clutch of the vehicle and the electrical vehicle circuits include an ignition interlock circuit to allow starting of the engine of the vehicle in response to activation of the interlock circuit by an appropriate contact of the switch.

11. A method according to claim 10 wherein:

(J) another of the electrical circuits comprises a circuit controlling a cruise control system for the vehicle.

12. A method according to claim 10 wherein:

(J) another of the vehicle circuits comprises a circuit controlling an electronic fuel injection system for the vehicle.

13. A method of assembling a motor vehicle to provide a hydraulic control system for the clutch of the motor vehicle and a means of controlling a plurality of electrical control systems for the vehicle, said method comprising:

(A) forming a master cylinder having a housing including a discharge fitting and an input rod extending at one end thereof into the input end of the housing and having means at the other, free end thereof for connection to an operator actuated clutch pedal of the motor vehicle;

(B) forming a slave cylinder having a housing including an inlet fitting and an output rod extending from the output end of the slave cylinder housing;

(C) forming conduit means for respective connection at its opposite ends to the discharge fitting of the master cylinder housing and t he inlet fitting of the slave cylinder housing, (D) filling the master cylinder, conduit means, and slave cylinder with hydraulic fluid so that, with the conduit means connected between the master and slave cylinders, axial stroking movement of the input rod of the master cylinder relative to the housing of the master cylinder delivers pressurized fluid through the conduit means to the slave cylinder to extend the output rod of the slave cylinder;

(E) providing a switch having a plurality of axially spaced contacts and a plurality of outlets corresponding to the contacts;

(F) mounting the switch on the input rod of the master cylinder in a manner such that the switch contacts are spaced axially along said input rod between said one end of said housing and said free end of said input rod and are successively made or broken in response to axial stroking movement of the master cylinder input rod relative to the master cylinder housing;

(G) positioning the master cylinder in the engine compartment of the vehicle and passing the input rod with the switch mounted thereon from the engine compartment through an aperture in the firewall of the vehicle to position the input rd and switch in the passenger compartment of the vehicle and position the master cylinder housing adjacent the firewall;

(H) securing the master cylinder housing to the firewall;

(I) connecting the master cylinder input rod to the operator actuated clutch pedal;

(J) securing the slave cylinder housing to the vehicle adjacent the clutch of the vehicle;

(K) respectively connecting a plurality of electrical vehicle circuits respectively controlling a plurality of vehicle control systems to the plurality of outlets of the switch so that the plurality of electrical control systems for the vehicle are respectively controlled by the contacts of the switch; and (L) positioning the output rod of the slave cylinder in operative relation to the release bearing assembly of the clutch of the vehicle;

whereby axial stroking movement of the input rod of the master cylinder relative to the master cylinder housing in response to operator actuation of said clutch pedal operates to control the release bearing assembly of the clutch of the vehicle and selectively activates or deactivates the several electrical control circuits of the vehicle to respectively control the associated electrical control systems of the vehicle.

14. A method according to claim 13 wherein:

(M) one of the electrical vehicle circuits controls an ignition interlock system for the vehicle.

15. A method according to claim 14 wherein:

(N) another of the electrical vehicle circuits controls a cruise control system for the vehicle.

16. A method according to claim 14 wherein:

(O) another of the electrical vehicle circuits controls an electronic fuel injection system for the vehicle.

17. A method of providing a hydraulic control system and a means of controlling a plurality of electrical control systems for a motor vehicle, said method comprising:

(A) forming a master cylinder having a housing including a discharge fitting and an input rod extending into one end of the housing;

(B) filling the master cylinder with hydraulic fluid so that axial stroking movement of the input rod relative to the housing delivers pressurized fluid from the discharge fitting which may be delivered to a slave cylinder to operate a control mechanism of the vehicle;

(C) providing a switch having a plurality of spaced contacts and a plurality of outlets corresponding to said contacts;

(D) mounting said switch on said input rod in a manner such that the switch is biased against the input end of the master cylinder housing while allowing swiveling movement of the switch relative to the master cylinder housing and in a manner such that said contacts are successively made or broken in response to axial stroking movement of the input rod relative to said master cylinder housing;

(E) positioning said master cylinder in the engine compartment of the vehicle and passing said input rod with said switch mounted thereon from the engine compartment through an aperture in the firewall of the vehicle to position the input rod and switch in the passenger compartment of the vehicle and position the master cylinder housing adjacent the firewall;

(F) securing said master cylinder housing to said firewall;

(G) connecting said input rod to an operator actuated control pedal; and (H) respectively connecting a plurality of electrical vehicle circuits respectively controlling a plurality of vehicle control systems to the plurality of outlets of said switch so that the plurality of electrical control systems for the vehicle are respectively controlled by the contacts of said switch, whereby axial stroking movement of said input rod relative to said master cylinder housing in response to operator actuation of said control pedal operates the control mechanism of the vehicle and selectively activates or deactivates the several electrical control circuits of the vehicle to respectively control the associated electrical control systems of the vehicle.

* * * * *